Patented Apr. 11, 1950

2,504,065

UNITED STATES PATENT OFFICE 2,504,065

CHLORINATED RUBBER POWDER AND METHOD OF PREPARATION

La Verne E. Cheyney, Columbus, Ohio, assignor to Wingfoot Corporation, Akron, Ohio, a corporation of Delaware No Drawing. Application February 25, 1946, Serial No. 650,115

6 Claims. (Cl. 260—772)

This invention relates to an improved quench liquid for the recovery of water-insoluble synthetic organic resinous masses which have a tendency to coalesce and particularly to the recovery of chlorinated rubbers in the form of discrete particles.

It is well known that certain water-insoluble synthetic organic masses, especially the chlorinated rubbers, are difficult to recover from their reaction solution using methods heretofore known, because when using these methods, for example, precipitation in water using an alcohol, the precipitated mass tends to gather into large lumps. These lumps or agglomerated masses are extremely difficult to handle in subsequent operations. This agglomerating action also causes the occlusion of foreign substances, the removal of which is a difficult and often unsuccessful operation. Therefore, it is particularly desirable to recover these masses in the form of discrete particles because they contain substantially no foreign matter and are readily processed and handled in an efficient, facile and economical manner in subsequent operations.

It has now been discovered that water-insoluble, synthetic organic resinous masses which have a tendency to coalesce, and particularly chlorinated natural rubber and the chlorinated synthetic rubbers, may be recovered from their solutions as discrete particles by treatment with a quench liquid having a hydrogen ion concentration (pH) on the acid side and comprising a major proportion of water and, as an emulsifying agent, a minor proportion of a phospholipide.

Synthetic resinous masses having a softening point substantially below 45° C. tend to coalesce and agglomerate into large lumps regardless of the method of recovery used. On the other hand, the higher the softening point the less is the tendency for the synthetic resinous mass to agglomerate and the easier is recovery in the form of discrete particles. Resins having a softening point between about 50° C. and about 65° C. are generally those more desirably recovered in the form of discrete particles.

In addition to chlorinated natural rubber, the chlorination products of any of the polymers resulting from the polymerization of the conjugated diene hydrocarbons, either alone or with another polymerizable monomer, may be recovered in this manner. Typical polymerized dienes that may be recovered successfully in the form of discrete particles are those resulting from the polymerization of butadiene-1,3, isoprene, 2,3-dimethyl butadiene-1,3, 1,3-dimethyl butadiene-1,3, pentadiene-1,3, pentadiene-1,4, 3-methyl pentadiene-2,4, 3,4-dimethyl pentadiene-2,4, the straight chain, branched chain and cyclic hexadienes, heptadienes, etc., and their homologs and hydrocarbon substitution products. Other polymerizable monomers that may be copolymerized with the dienes above are 2-chloro-2,3-butadiene styrene, dichlorostyrene, acrylates and substituted acrylates, vinyl chloride, fumarates, e. g., dimethyl fumarate, maleates, e. g., dimethyl- and diethyl-maleates, etc.

The method of this invention is particularly adaptable to the recovery of chlorinated products of natural rubber and the synthetic rubbers resulting from the polymerization of dienes, particularly butadiene, and copolymers of butadiene and another polymerizable monomer, such as styrene and acrylonitrile.

More specifically, the quench liquid of this invention comprises a major proportion of water containing as an emulsifying agent a minor proportion of a phospholipide, and having a pH below about 6.

All of the members of the class of lipides are not operable in bringing about the desired result. The simple lipides, especially, are not found to be satisfactory. However, the class of complex lipides known as the phospholipides, do function to effect the desired result. The phospholipides of this invention are those having the general formula

$$C_3H_5(OR)_2[O\ PO(OH)\ X]$$

where R is a fatty acid radical and X is the nitrogen base choline or cholamine. More particularly, R is the radical of a higher unsaturated fatty acid, e. g., oleic, linolic, linolenic and arachidonic acids, or of a higher saturated fatty acid, e. g., palmitic and stearic acids. The preferred group of phospholipides is the lecithins, and especially soya bean lecithin. The lecithins have the general formula

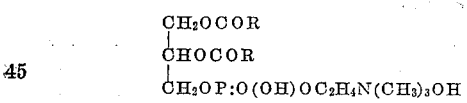

```
CH₂OCOR
|
CHOCOR
|
CH₂OP:O(OH)OC₂H₄N(CH₃)₃OH
``` in which R is a higher fatty acid radical including palmitic, stearic, oleic, linolic, linolenic and arachidonic. A specific member of this group of lecithins is the soya bean lecithin.

The preferred group of phospholipides, the lecithins, are defined as glycerides which contain two fatty acid radicals and phosphoric acid to which the base choline is attached in the manner shown by the structural formula above. The cephalins are similar, but contain an aminoethyl alcohol residue in place of choline. It should be understood that the lecithins and cephalins used in this invention are a mixture of lecithins and cephalin and that the purest lecithin and cephalin are believed to be a mixture of at least two lecithins or two cephalins.

The vegetable fat phospholipides, soya bean lecithin, and soya bean cephalin, are especially desirable in practicing the present invention because it has been discovered that an increase in thermal stability of the chlorinated product results. This increase in thermal stability, particularly with respect to chlorinated natural rubber and chlorinated synthetic rubber, especially chlorinated diene polymers and copolymers, e. g., butadiene-1,3 and styrene (Buna S), is desirable since the product has a lesser tendency to lose hydrogen chloride than the chlorinated products not so treated.

The term "thermal stability" is a measure of the resistance of the product to lose hydrogen chloride gas when heated. Thermal stability is measured by heating at the rate of 1° C. per minute a predetermined amount of the product in dry form in a suitable container until sufficient hydrogen chloride gas has been given off to just noticeably turn the lower portion of a strip of Congo red paper blue. Thermal stability is then recorded as that temperature at which the first noticeable color change takes place in the paper. The paper is 2 inches long and ¼ inch wide and is suspended vertically 2 inches above the surface of the material.

In addition to the use of a phospholipide in the quench liquid in amounts between about 1% and about 5%, based upon the weight of the resinous mass being treated, and preferably in an amount of about 3%, it is essential that the quench liquid have a pH below about 6 in order to recover the product in the form of discrete particles. The preferred pH range is between about 1 and about 3, and best results are obtained when maintaining a pH of about 2. The acid condition of the quench liquid may be stabilized, where the mass being treated has an excess acidity, by the employment of a suitable buffer, e. g., trisodium phosphate, which may be added in amount between about 1% and about 5%, based upon the weight of the product being recovered.

Generally, the ratio of water in the quench liquid to the solution of the product to be treated may vary between about 1 to 4 by volume, and is preferably about 2.

The following examples illustrate specific embodiments of the invention and are intended to be illustrative only and not limitations on the scope of the invention. The term "parts" whenever hereinafter used, signifies "parts by weight."

EXAMPLE 1

Chlorinated natural rubber

A quantity of natural rubber was chlorinated in carbon tetrachloride until the product possessed approximately 65% chlorine. A quantity of 100 parts of a 5% carbon tetrachloride solution of the material was added to a quench liquid having a pH of about 6, containing 300 parts of water and .75 part of soya bean lecithin. The carbon tetrachloride solvent was removed by steam distillation and most of the water removed from the spongy product by filtration. The remainder of the water was then removed by drying in vacuo to produce a chlorinated product in the form of discrete particles. The dried product was ground very readily to yield a free-flowing powder. This product possessed a thermal stability of 135° C., whereas the corresponding non-granular product isolated by precipitation with methanol, possessed a thermal stability of only 116° C.

EXAMPLE 2

Chlorinated butadiene-1,3/styrene copolymer

A quantity of a synthetic rubber resulting from the copolymerization of a mixture of 72 parts of butadiene-1,3 and 28 parts of styrene, alum-coagulated, was chlorinated in chloroform to a chlorine content of 58%. A 5% chloroform solution of 100 parts of the material was added to a quench liquid containing 350 parts of water and 1 part of soya bean lecithin. The chloroform solvent was removed by steam distillation and most of the water removed from the mass by filtration. The remainder of the water was removed by drying in vacuo to produce a chlorinated product in the form of discrete particles. The granular product had a thermal stability of 116° C., compared with 104° C. for the corresponding methanol-precipitated product.

The same general results with respect to recovery in the form of discrete particles and increase in thermal stability may also be obtained for each of the following materials: butadiene-1,3 (55 to 75 parts)-acrylonitrile (45 to 25 parts) copolymers, isobutylene (25 to 75 parts)-isoprene (75 to 25 parts) copolymers and butadiene-1,3 (25 to 75 parts)-styrene (75 to 25 parts) copolymers and their chlorinated derivatives.

Suitable changes may be made in the details of the process without departing from the spirit or scope of the invention, the proper limits of which are defined in the appended claims.

I claim:

1. A composition comprising chlorinated rubber having a melting point between 45° C. and 65° C. admixed with an organic volatile solvent, 1 to 4 volumes of water per volume of chlorinated rubber solution, and 1 to 5% of a phospholipide selected from the group consisting of lecithin and cephalin based on the weight of the chlorinated rubber, the composition having a pH below 6, the chlorinated rubber being recoverable from solution in powder form by removal of the water and the organic volatile solvent from the composition.

2. A composition comprising chlorinated rubber having a melting point between 45° C. and 65° C. admixed with an organic volatile solvent, 1 to 4 volumes of water per volume of chlorinated rubber solution, and 1 to 5% of lecithin based on the weight of the chlorinated rubber, the composition having a pH below 6, the chlorinated rubber being recoverable from solution in powder form by removal of the water and the organic volatile solvent from the composition.

3. A composition comprising chlorinated rubber having a melting point between 45° C. and 65° C. admixed with an organic volatile solvent, 1 to 4 volumes of water per volume of chlorinated rubber solution, and 1 to 5% of soyabean lecithin based on the weight of the chlorinated rubber, the composition having a pH below 6, the chlorinated rubber being recoverable from solution in powder form by removal of the water and the organic volatile solvent from the composition.

4. A composition comprising chlorinated rubber having a melting point between 45° C. and 65° C. admixed with an organic volatile solvent, 1 to 4 volumes of water per volume of chlorinated rubber solution, and 1 to 5% of cephalin based on the weight of the chlorinated rubber, the composition having a pH below 6, the chlorinated rubber being recoverable from solution in powder form by removal of the water and the organic volatile solvent from the composition.

5. A composition comprising chlorinated rubber having a melting point between 45° C. and 65° C. admixed with an organic volatile solvent, 1 to 4 volumes of water per volume of chlorinated rubber solution, and 1 to 5% of soyabean cephalin based on the weight of the chlorinated rubber, the composition having a pH below 6, the chlorinated rubber being recoverable from solution in powder form by removal of the water and the organic volatile solvent from the composition.

6. The method of precipitating from solution chlorinated rubber in powder form and having a softening point between 45° C. and 65° C. consisting of the steps of adding a solution of the chlorinated rubber dissolved in an organic volatile solvent to 1 to 4 volumes of water per volume of chlorinated rubber solution, the water containing 1 to 5% of a phospholipide selected from the group consisting of lecithin and cephalin based on the weight of the chlorinated rubber, removing the organic volatile solvent and water from the mixture and recovering the chlorinated rubber in powder form.

LA VERNE E. CHEYNEY.

REFERENCES CITED

The following references are of record in the file of this patent:

UNITED STATES PATENTS

| Number | Name | Date |
|---|---|---|
| 1,946,333 | Rewald | Feb. 6, 1934 |
| 2,094,408 | Orthner et al. | Sept. 28, 1937 |
| 2,374,681 | Julian et al. | May 1, 1945 |
| 2,379,792 | Donian | July 3, 1945 |
| 2,389,958 | Crawford et al. | Nov. 27, 1945 |

FOREIGN PATENTS

| Number | Country | Date |
|---|---|---|
| 414,072 | Great Britain | July 26, 1934 |
| 414,862 | Great Britain | Aug. 16, 1934 |
| 501,033 | Great Britain | May 18, 1937 |